(12) United States Patent
Chae et al.

(10) Patent No.: US 9,519,190 B2
(45) Date of Patent: Dec. 13, 2016

(54) DISPLAY DEVICE AND MANUFACTURING METHOD THEREOF

(71) Applicant: SAMSUNG DISPLAY CO., LTD., Yongin, Gyeonggi-Do (KR)

(72) Inventors: Kyung Tae Chae, Yongin (KR); Seon Uk Lee, Yongin (KR); Chung Hyuk Lee, Yongin (KR); Tae Woo Lim, Yongin (KR); Don Chan Cho, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 137 days.

(21) Appl. No.: 14/264,248

(22) Filed: Apr. 29, 2014

(65) Prior Publication Data

US 2015/0015825 A1 Jan. 15, 2015

(30) Foreign Application Priority Data

Jul. 10, 2013 (KR) ........................ 10-2013-0081243

(51) Int. Cl.
*G02F 1/1333* (2006.01)
*G02F 1/1341* (2006.01)
*G02F 1/1335* (2006.01)

(52) U.S. Cl.
CPC ....... *G02F 1/1341* (2013.01); *G02F 1/133345* (2013.01); *G02F 1/133377* (2013.01); *G02F 1/1335* (2013.01); *G02F 1/133514* (2013.01)

(58) Field of Classification Search
CPC .................. G02F 1/133377; G02F 1/133707; G02F 1/136209; G02F 1/1341; G02F 1/133514; G02F 1/133345

USPC ... 349/158, 187–190, 156, 154, 106; 438/30
See application file for complete search history.

(56) References Cited

U.S. PATENT DOCUMENTS

| | | | |
|---|---|---|---|
| 2006/0046163 A1* | 3/2006 | Broer ..................... | G02B 5/201 430/7 |
| 2012/0062448 A1* | 3/2012 | Kim .................. | G02F 1/133377 345/55 |
| 2013/0093985 A1* | 4/2013 | Kang ................ | G02F 1/133377 349/106 |
| 2013/0250220 A1* | 9/2013 | Kim ...................... | G02F 1/1341 349/123 |

(Continued)

FOREIGN PATENT DOCUMENTS

KR 10-2012-0026880 A 3/2012

*Primary Examiner* — Paul Lee
*Assistant Examiner* — Jia Pan
(74) *Attorney, Agent, or Firm* — Lee & Morse, P.C.

(57) ABSTRACT

A display device includes a substrate including a plurality of pixel areas, a thin film transistor positioned on the substrate, a first insulating layer positioned on the thin film transistor, a pixel electrode connected with the thin film transistor and positioned on the first insulating layer, a common electrode positioned on the pixel electrode and spaced apart from the pixel electrode by a microcavity, a second insulating layer positioned on the common electrode, a roof layer positioned on the second insulating layer, a thickness of the roof layer being about 4 μm to about 50 μm, an injection hole through the common electrode, the second insulating layer, and the roof layer, the injection hole exposing a part of the microcavity, a liquid crystal layer filling the microcavity, and an overcoat on the roof layer and extending into the injection hole, the overcoat sealing the microcavity.

19 Claims, 16 Drawing Sheets

(56) References Cited

U.S. PATENT DOCUMENTS

| | | | | |
|---|---|---|---|---|
| 2013/0308071 A1* | 11/2013 | Kim | ................. | H01L 33/08 349/43 |
| 2013/0335664 A1* | 12/2013 | Shim | ................. | G02F 1/1339 349/43 |
| 2015/0170605 A1* | 6/2015 | Watakabe | ......... | G02F 1/133514 345/600 |

* cited by examiner

DISPLAY DEVICE AND MANUFACTURING METHOD THEREOF

CROSS-REFERENCE TO RELATED APPLICATION

Korean Patent Application No. 10-2013-0081243, filed on Jul. 10, 2013, in the Korean Intellectual Property Office, and entitled: "Display Device and Manufacturing Method Thereof," is incorporated by reference herein in its entirety.

BACKGROUND

1. Field

Embodiments relate to a display device and a manufacturing method thereof, and more particularly, to a display device and a manufacturing method thereof capable of reducing the number of remaining liquid crystals.

2. Description of the Related Art

Display devices are required for computer monitors, televisions, mobile phones, and the like, which are widely used these days. The display devices may include, e.g., a cathode ray tube display device, a liquid crystal display, a plasma display device, and the like.

The liquid crystal display, which is one of the most common types of flat panel displays currently in use, includes two sheets of display panels with field generating electrodes, such as a pixel electrode, a common electrode, and the like, and a liquid crystal layer interposed therebetween. The liquid crystal display generates an electric field in the liquid crystal layer by applying voltage to the field generating electrodes to control alignment of liquid crystal molecules of the liquid crystal layer through the generated electric field and control polarization of incident light, thereby displaying images.

The two sheets of display panels of the liquid crystal display may include a thin film transistor array panel and an opposing display panel. In the thin film transistor array panel, a gate line transferring a gate signal and a data line transferring a data signal are formed to cross each other, and a thin film transistor connected with the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

SUMMARY

An exemplary embodiment provides a display device including a substrate including a plurality of pixel areas, a thin film transistor positioned on the substrate, a first insulating layer positioned on the thin film transistor, a pixel electrode connected with the thin film transistor and positioned on the first insulating layer, a common electrode positioned on the pixel electrode and spaced apart from the pixel electrode by a microcavity, a second insulating layer positioned on the common electrode, a roof layer positioned on the second insulating layer, a thickness of the roof layer being about 4 μm to about 50 μm, an injection hole through the common electrode, the second insulating layer, and the roof layer, the injection hole exposing a part of the microcavity, a liquid crystal layer filling the microcavity, and an overcoat on the roof layer and extending into the injection hole, the overcoat sealing the microcavity.

The thickness of the roof layer may be equal to or more than approximately 8 μm.

An angle between the roof layer and the second insulating layer may be in the range of approximately 30° to approximately 90°.

The angle between the roof layer and the second insulating layer may be approximately 45°.

A tilted surface of the roof layer may have a step shape.

The display device may further include a water-repellent layer positioned on the roof layer.

The second insulating layer may be made of one of silicon nitride, silicon oxide, and silicon oxynitride.

The display device may further include a third insulating layer formed on the roof layer.

The third insulating layer may be made of one of silicon nitride, silicon oxide, and silicon oxynitride.

Another exemplary embodiment provides a manufacturing method of a display device, including: forming a thin film transistor on a substrate; forming a first insulating layer on the thin film transistor; forming a pixel electrode connected with the thin film transistor on the first insulating layer; forming a sacrificial layer on the pixel electrode; forming a common electrode on the sacrificial layer; forming a second insulating layer on the common electrode; forming a roof layer by applying and patterning an organic material onto the second insulating layer; exposing the sacrificial layer; forming a microcavity between the pixel electrode and the common electrode by removing the exposed sacrificial layer; forming a liquid crystal layer by injecting a liquid crystal material into the microcavity; and sealing the microcavity by forming an overcoat on the roof layer, and the thickness of the roof layer is more than approximately 4 μm or equal to or less than approximately 50 μm.

The method may further include forming a water-repellent layer on the formed roof layer.

The method may further include removing a third insulating layer formed directly on the sacrificial layer by patterning the third insulating layer.

The sacrificial layer is ashed and thereafter, the third insulating layer may be formed.

In the removing of the sacrificial layer, the third insulating layer positioned directly on the sacrificial layer may be lifted off.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
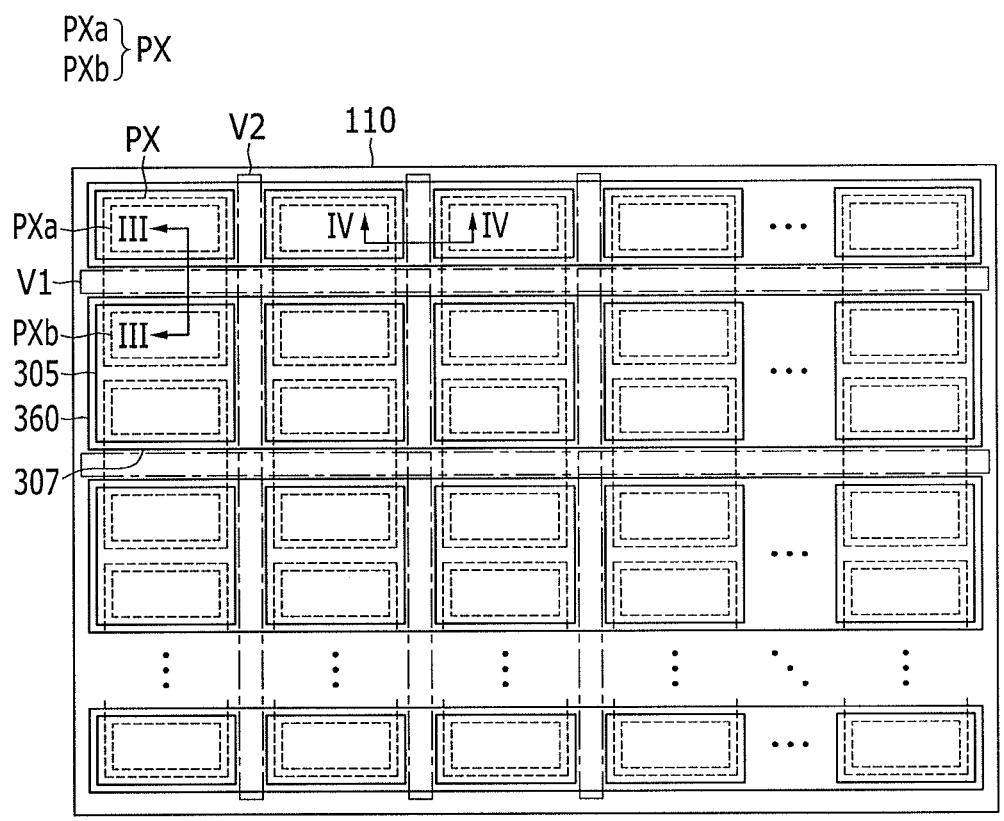
FIG. 1 illustrates a plan view of a display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a display device according to an exemplary embodiment will be schematically described below with reference to the accompanying drawings.

FIG. 1 illustrates a plan view of a display device according to an exemplary embodiment. For convenience, FIG. 1 illustrates only some constituent elements.

A display device according to the exemplary embodiment may include a substrate 110 made of, e.g., glass or plastic, and a roof layer 360 formed on the substrate 110. The substrate 110 may include a plurality of pixel areas PX.

The plurality of pixel areas PX may be disposed in a matrix form, which includes a plurality of pixel rows and a plurality of pixel columns. Each pixel area PX may include a first subpixel area PXa and a second subpixel area PXb. The first subpixel area PXa and the second subpixel area PXb may be vertically disposed. A first valley V1 is positioned between the first subpixel area PXa and the second subpixel area PXb in a pixel row direction, and a second valley V2 is positioned between a plurality of pixel columns.

The roof layer 360 is formed in a pixel row direction. In this case, the roof layer 360 is removed at the first valley V1, so an injection hole 307 is formed to expose to the outside a constituent element positioned below the roof layer 360. For example, the injection hole 307 may overlap, e.g., completely overlap, the first valley V1, and may separate two adjacent roof layers 360 along the column direction. For example, each of the roof layer 360 and the injection hole 307 may continuously extend along the entire row direction.

Each roof layer 360 is formed to be separated from the substrate 110 between the adjacent second valleys V2 to form a microcavity 305. Further, each roof layer 360 is formed to be attached to the substrate 110 at the second valley V2 to cover both sides of the microcavity 305.

A structure of the display device according to the exemplary embodiment described above is just exemplified and may be variously modified. For example, a layout form of the pixel area PX, the first valley V1, and the second valley V2 may be modified, so the plurality of roof layers 360 may be connected to each other at the first valley V1, and a part of each roof layer 360 may be separated from the substrate 110 at the second valley V2 to have adjacent microcavities 305 connected to each other.

Next, one pixel of the display device according to the exemplary embodiment will be described below with reference to FIG. 1 in addition to FIGS. 2 to 4.

Figure 2:
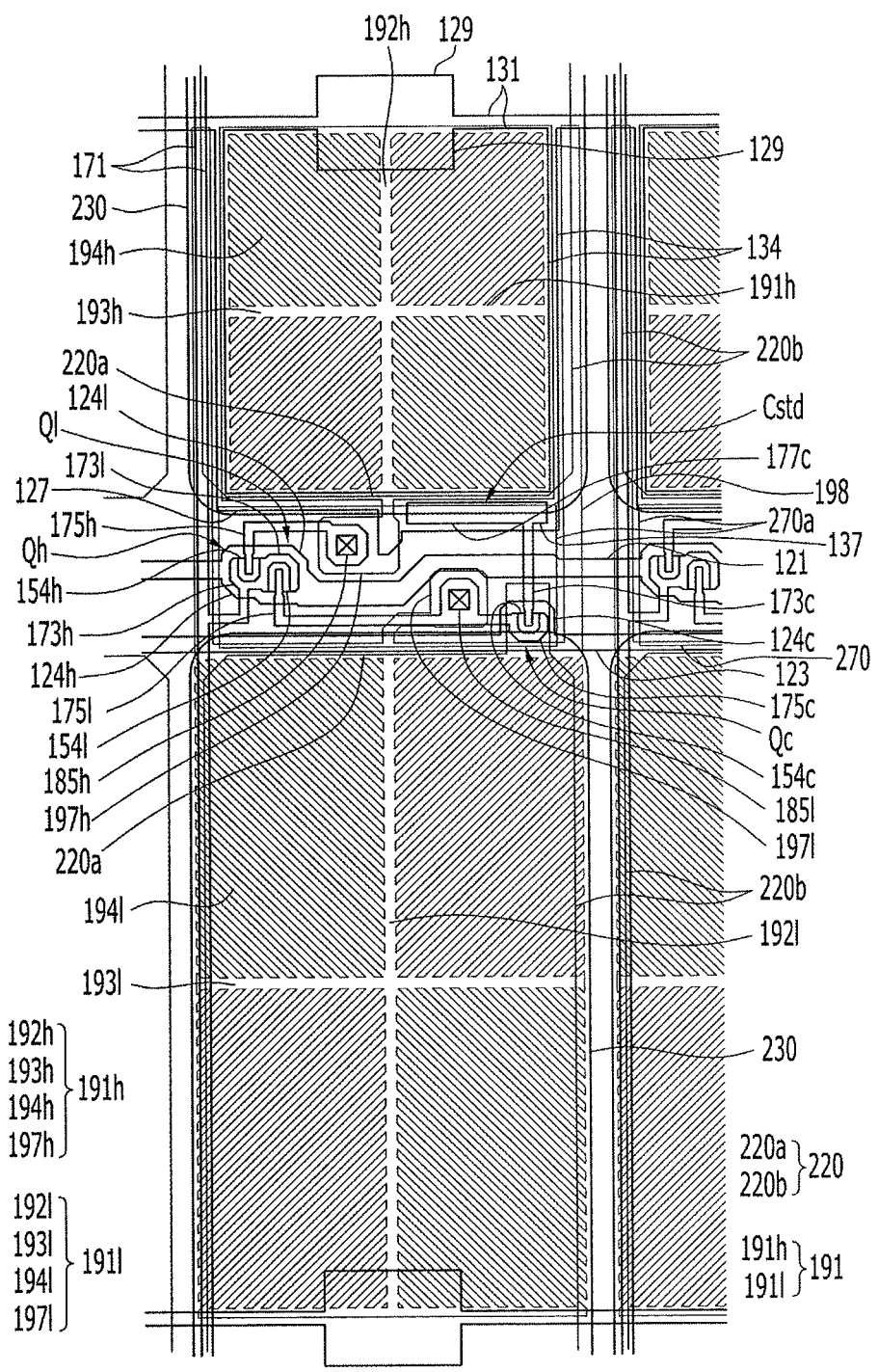
FIG. 2 illustrates a plan view of one pixel of a display device according to the exemplary embodiment.
Figure 3:
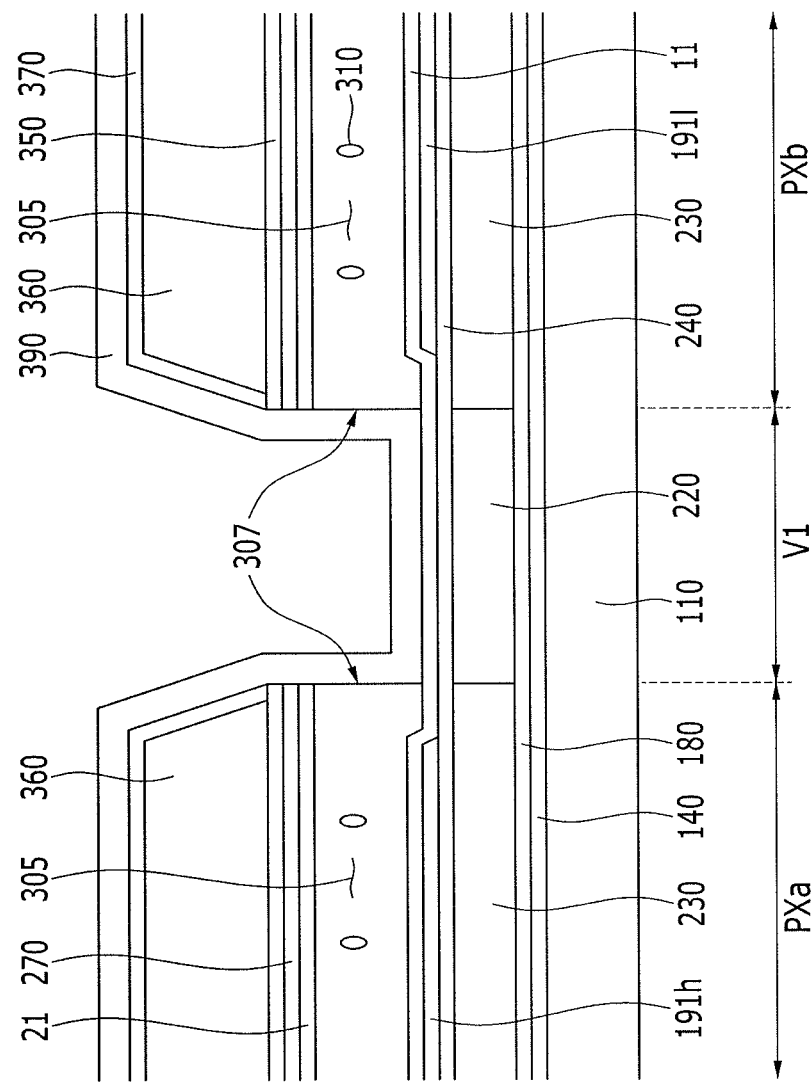
FIG. 3 illustrates a cross-sectional along line III-III of FIG. 1.
Figure 4:
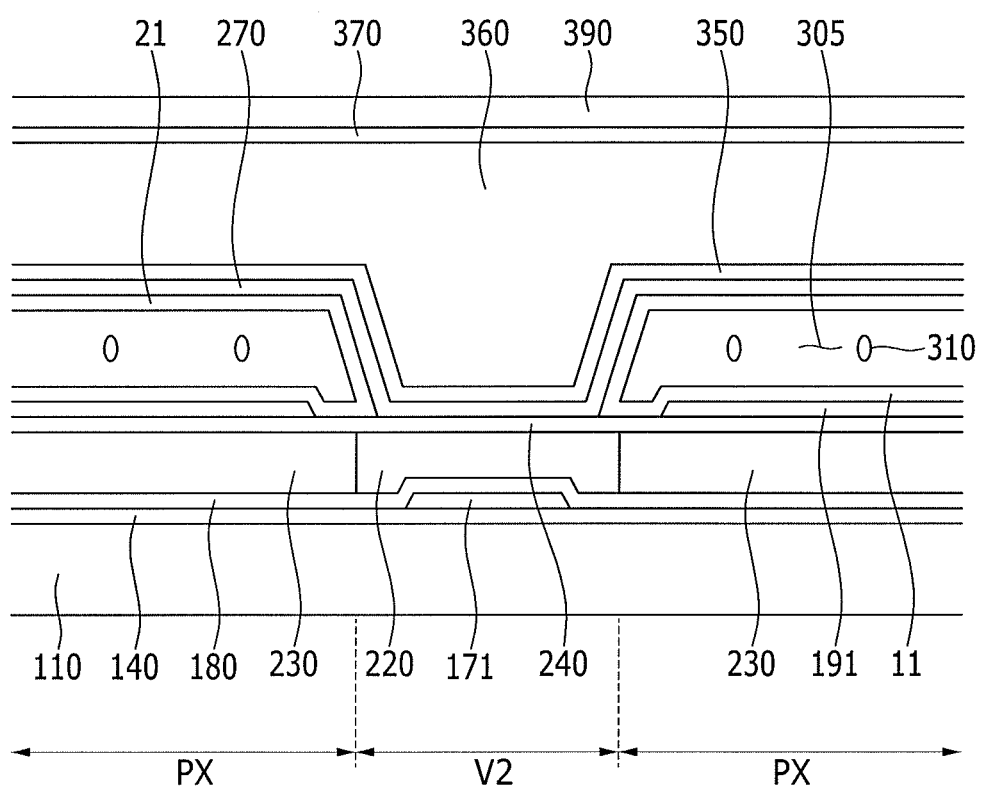
FIG. 4 illustrates a cross-sectional along line IV-IV of FIG. 1.

FIG. 2 illustrates a plan view of one pixel of the display device according to the exemplary embodiment, FIG. 3 illustrates a cross-sectional along line III-III of FIG. 1, and FIG. 4 illustrates a cross-sectional view along line IV-IV of FIG. 1.

Referring to FIGS. 1 to 4, a plurality of gate conductors including a plurality of gate lines 121, a plurality of step-down gate lines 123, and a plurality of storage electrode lines 131 may be formed on the substrate 110.

The gate line 121 and the step-down gate line 123 mainly extend in a horizontal direction to transfer gate signals. The gate conductor may further include a first gate electrode 124h and a second gate electrode 124I protruding upward and downward from the gate line 121, and a third gate electrode 124c protruding upward from the step-down gate line 123. The first gate electrode 124h and the second gate electrode 124I are connected with each other to form one protrusion. In this case, the protrusion form of the first, second, and third gate electrodes 124h, 124l, and 124c may be modified.

The storage electrode line 131 mainly extends in a horizontal direction to transfer a predetermined voltage such as a common voltage Vcom. The storage electrode line 131 may include storage electrodes 129 protruding upward and downward, a pair of vertical portions 134 extending downward to be substantially vertical to the gate line 121, and a horizontal portion 127 connecting ends of the pair of vertical portions 134. The horizontal portion 127 includes a capacitor electrode 137 expanded downward.

A gate insulating layer 140 is formed on the gate conductor 121, 123, 124h, 124l, 124c, and 131. The gate insulating layer 140 may be made of an inorganic insulating material, e.g., silicon nitride ($SiN_x$) and silicon oxide ($SiO_x$). Further, the gate insulating layer 140 may be constituted by a single layer or multiple layers.

A first semiconductor 154h, a second semiconductor 154l, and a third semiconductor 154c may be formed on the gate insulating layer 140. The first semiconductor 154h may be positioned on the first gate electrode 124h, the second semiconductor 154l may be positioned on the second gate electrode 124l, and the third semiconductor 154c may be positioned on the third gate electrode 124c. The first semiconductor 154h and the second semiconductor 154l may be connected to each other, and the second semiconductor 154l and the third semiconductor 154c may be connected to each other. Further, the first semiconductor 154h may be extended to a lower portion of a data line 171. The first to third semiconductors 154h, 154l, and 154c may be made of, e.g., amorphous silicon, polycrystalline silicon, metal oxide, and the like.

Ohmic contacts (not illustrated) may be further formed on the first to third semiconductors 154h, 154l, and 154c, respectively. The ohmic contact may be made of silicide or a material such as n+ hydrogenated amorphous silicon in which an n-type impurity is doped at a high concentration.

A data conductor including the data line 171, a first source electrode 173h, a second source electrode 173l, a third source electrode 173c, a first drain electrode 175h, a second drain electrode 175l, and a third drain electrode 175c may be formed on the first to third semiconductors 154h, 154l, and 154c.

The data line 171 transfers a data signal and mainly extends in a vertical direction to cross the gate line 121 and the step-down gate line 123. Each data line 171 may include a first source electrode 173*h* and a second source electrode 173*l* which extend toward the first gate electrode 124*h* and the second gate electrode 124*l* and are connected with each other.

A first drain electrode 175*h*, a second drain electrode 175*l*, and a third drain electrode 175*c* include one wide end portions and the other rod-shaped end portions, respectively. The rod-shaped end portions of the first drain electrode 175*h* and the second drain electrode 175*l* are partially surrounded by the first source electrode 173*h* and the second source electrode 173*l*. One wide end portion of the second drain electrode 175*l* is again extended to form a third source electrode 173*c* which is bent in a 'U'-shape. A wide end portion 177*c* of the third drain electrode 175*c* is overlapped with the capacitor electrode 137 to form a step-down capacitor Cstd, and the rod-shaped end portion is partially surrounded by the third source electrode 173*c*.

The first gate electrode 124*h*, the first source electrode 173*h*, and the first drain electrode 175*h* form a first thin film transistor Qh together with the first semiconductor 154*h*, the second gate electrode 124*l*, the second source electrode 173*l*, and the second drain electrode 175*l* form a second thin film transistor Ql together with the second semiconductor 154*l*, and the third gate electrode 124*c*, the third source electrode 173*c* and the third drain electrode 175*c* form the third thin film transistor Qc together with the third semiconductor 154*c*.

The first semiconductor 154*h*, the second semiconductor 154*l*, and the third semiconductor 154*c* are connected to each other to form in a stripe shape, and may have substantially the same planar shape as the data conductor 171, 173*h*, 173*l*, 173*c*, 175*h*, 175*l*, and 175*c* and the ohmic contacts therebelow, except for channel regions between the source electrodes 173*h*, 173*l*, and 173*c* and the drain electrodes 175*h*, 173*l*, and 175*c*.

In the first semiconductor 154*h*, an exposed portion which is not covered by the first source electrode 173*h* and the first drain electrode 175*h* is disposed between the first source electrode 173*h* and the first drain electrode 175*h*. In the second semiconductor 154*l*, an exposed portion which is not covered by the second source electrode 173*l* and the second drain electrode 175*l* is disposed between the second source electrode 173*l* and the second drain electrode 175*l*. In addition, in the third semiconductor 154*c*, an exposed portion which is not covered by the third source electrode 173*c* and the third drain electrode 175*c* is disposed between the third source electrode 173*c* and the third drain electrode 175*c*.

A passivation layer 180 is formed on the data conductor 171, 173*h*, 173*l*, 173*c*, 175*h*, 175*l*, and 175*c* and the semiconductors 154*h*, 154*l*, and 154*c* exposed between the respective source electrodes 173*h*/173*l*/173*c* and the respective drain electrodes 175*h*/175*l*/175*c*. The passivation layer 180 may be made of an organic insulating material or an inorganic insulating material, and may be formed in a single layer or multiple layers.

A color filter 230 in each pixel area PX may be formed on the passivation layer 180. Each color filter 230 may display one of primary colors, e.g., one of red, green and blue. The color filter 230 is not limited to the three primary colors of red, green and blue, but may display one of cyan, magenta, yellow, and white-based colors. Unlike those illustrated above, the color filter 230 may be elongated in a column direction along a space between the adjacent data lines 171.

A light blocking member 220 may be formed in a region between adjacent color filters 230. The light blocking member 220 may be formed on a boundary of the pixel area PX and the thin film transistor to prevent light leakage. The color filter 230 may be formed in each of the first subpixel area PXa and the second subpixel area PXb, and the light blocking member 220 may be formed between the first subpixel area PXa and the second subpixel area PXb.

The light blocking member 220 may include a horizontal light blocking member 220*a* which extends along the gate line 121 and the step-down gate line 123 to be expanded upward and downward, and covers regions in which the first thin film transistor Qh, the second thin film transistor Ql, and the third thin film transistor Qc are positioned, and a vertical light blocking member 220*b* which extends along the data line 171. That is, the horizontal light blocking member 220*a* may be formed at the first valley V1, and the vertical light blocking member 220*b* may be formed at the second valley V2. The color filter 230 and the light blocking member 220 may be overlapped with each other in a partial region.

A first insulating layer 240 may be further formed on the color filter 230 and the light blocking member 220. The first insulating layer 240 may be made of an inorganic insulating material, e.g., silicon nitride ($SiN_x$), silicon oxide ($SiO_x$), and silicon oxynitride ($SiO_xN_y$). The first insulating layer 240 serves to protect the color filter 230 made of the organic material and the light blocking member 220, and may be omitted if necessary.

In the first insulating layer 240, the light blocking member 220, and the passivation layer 180, a plurality of first contact holes 185*h* and a plurality of second contact holes 185*l*, which expose the wide end portion of the first drain electrode 175*h* and the wide end portion of the second drain electrode 175*l*, respectively, are formed.

A pixel electrode 191 is formed on the first insulating layer 240. The pixel electrode 191 may be made of a transparent metal material, e.g., indium tin oxide (ITO) and/or indium zinc oxide (IZO).

The pixel electrode 191 includes a first subpixel electrode 191*h* and a second subpixel electrode 191*l*, which are separated from each other with the gate line 121 and the step-down gate line 123 therebetween, and disposed above and below the pixel area PX based on the gate line 121 and the step-down gate line 123 to be adjacent to each other in a column direction. That is, the first subpixel electrode 191*h* and the second subpixel electrode 191*l* are separated from each other with the first valley V1 therebetween, the first subpixel electrode 191*h* is positioned in the first subpixel area PXa, and the second subpixel electrode 191*l* is positioned in the second subpixel area PXb.

The first subpixel electrode 191*h* and the second subpixel electrode 191*l* are connected to the first drain electrode 175*h* and the second drain electrode 175*l* through the first contact hole 185*h* and the second contact hole 185*l*, respectively. Accordingly, when the first thin film transistor Qh and the second thin film transistor Ql are turned on, the first thin film transistor Qh and the second thin film transistor Ql receive data voltages from the first drain electrode 175*h* and the second drain electrode 175*l*.

An overall shape of each of the first subpixel electrode 191*h* and the second subpixel electrode 191*l* is a quadrangle, and the first subpixel electrode 191*h* and the second subpixel electrode 191*l* include cross stems including horizontal stems 193*h* and 193*l* and vertical stems 192*h* and 192*l* crossing the horizontal stems 193*h* and 193*l*, respectively. Further, the first subpixel electrode 191*h* and the second subpixel electrode 191*l* include a plurality of minute branches 194*h* and 194*l*, and protrusions 197*h* and 197*l* protruding downward or upward from edge sides of the subpixel electrodes 191*h* and 191*l*, respectively.

The pixel electrode 191 is divided into four subregions by the horizontal stems 193h and 193l and the vertical stems 192h and 192l. The minute branches 194h and 194l obliquely extend from the horizontal stems 193h and 193l and the vertical stems 192h and 192l, and the extending direction may form an angle of approximately 45 degrees or 135 degrees with the gate line 121 or the horizontal stems 193h and 193l. Further, directions in which the minute branches 194h and 194l of the two adjacent subregions extend may be perpendicular to each other.

In the exemplary embodiment, the first subpixel electrode 191h further includes an outer stem surrounding the outside, and the second subpixel electrode 191l includes horizontal portions positioned at an upper end and a lower end, and left and right vertical portions 198 positioned at the left and the right of the first subpixel electrode 191h. The left and right vertical portions 198 may prevent capacitive coupling, i.e., coupling between the data line 171 and the first subpixel electrode 191h.

The layout shape of the pixel area, the structure of the thin film transistor, and the shape of the pixel electrode described above are just exemplified, and embodiments are not limited thereto and may be variously modified.

A common electrode 270 is formed on the pixel electrode 191 so as to be spaced apart from the pixel electrode 191 at a predetermined distance. A microcavity 305 is formed between the pixel electrode 191 and the common electrode 270. That is, the microcavity 305 is surrounded by the pixel electrode 191 and the common electrode 270. A width and an area of the microcavity 305 may be variously modified according to the size and resolution of the display device.

The common electrode 270 may be made of a transparent metal material, e.g., indium tin oxide (ITO) and/or indium zinc oxide (IZO). A predetermined voltage may be applied to the common electrode 270, and an electric field may be generated between the pixel electrode 191 and the common electrode 270.

A first alignment layer 11 is formed on the pixel electrode 191. The first alignment layer 11 may also be formed directly on the first insulating layer 240 which is not covered by the pixel electrode 191.

A second alignment layer 21 is formed below the common electrode 270 to face the first alignment layer 11.

The first alignment layer 11 and the second alignment layer 21 may be formed by vertical alignment layers, and may be made of alignment materials, e.g., polyamic acid, polysiloxane, and polyimide. The first and second alignment layers 11 and 21 may be connected to each other at an edge of the pixel area PX.

A liquid crystal layer constituted by liquid crystal molecules 310 is formed in the microcavity 305 positioned between the pixel electrode 191 and the common electrode 270. The liquid crystal molecules 310 have negative dielectric anisotropy, and may be aligned in a vertical direction to the substrate 110 while the electric field is not applied.

The first subpixel electrode 191h and the second subpixel electrode 191l, to which the data voltage is applied, generate an electric field together with the common electrode 270 to control directions of the liquid crystal molecules 310 positioned in the microcavity 305 between the electrodes 191 and 270. As such, luminance of light passing through the liquid crystal layer varies according to the determined directions of the liquid crystal molecules 310.

A second insulating layer 350 may be further formed on the common electrode 270. The second insulating layer 350 may be made of an inorganic insulating material, e.g., silicon nitride ($SiN_x$) and silicon oxide ($SiO_x$), and silicon oxynitride ($SiO_xN_y$), or may be omitted if necessary.

The roof layer 360 is formed on the second insulating layer 350. The roof layer 360 may be made of an organic material. The microcavity 305 is formed below the roof layer 360, and the shape of the microcavity 305 may be maintained by hardening the roof layer 360 by a curing process. That is, the roof layer 360 is formed to be spaced apart from the pixel electrode 191 with the microcavity 305 therebetween.

The roof layer 360 is formed in each pixel area PX along a pixel row and the second valley V2, and is not formed in the first valley V1. That is, the roof layer 360 is not formed between the first subpixel area PXa and the second subpixel area PXb of a same pixel area PX. The microcavity 305 is formed below each roof layer 360 in each of the first subpixel area PXa and the second subpixel area PXb. In the second valley V2, the microcavity 305 is not formed below the roof layer 360, but formed to be attached to the substrate 110. Accordingly, a thickness of the roof layer 360 positioned at the second valley V2 may be larger than a thickness of the roof layer 360 positioned in each of the first subpixel area PXa and the second subpixel area PXb. An upper surface and both sides of the microcavity 305 in the second valley V2 have a form covered by the roof layer 360.

The thickness of the formed roof layer 360 may be more than about 4 μm. In particular, the roof layer 360 may be thicker than a roof layer according to a comparative example to be described below, e.g., the thickness of the roof layer 360 may be equal to or greater than about 8 μm.

The reason is that as the thickness of the roof layer 360 increases, a center concentration effect of liquid crystals occurs. In other words, as the roof layer 360 is thicker, i.e., higher, liquid crystals are concentrated at the first valley V1 positioned between adjacent roof layers 360. Therefore, even though some liquid crystals contact the roof layer 360 during injection into the microcavities 305, the contact force with the roof layer 360 is low. As a result, the liquid crystals are prevented from remaining on the roof layer 360.

Meanwhile, since the roof layer 360 is not positioned in the first valley area V1, the roof layers 360 are spaced apart from each other with the first valley area V1 interposed therebetween. As a result, the roof layer 360 in an area adjacent to the first valley area V1 has a surface which is inclined and tilted, e.g., a side surface of the roof layer may be sloped at an oblique angle toward the first valley area V1. In this case, an angle between the tilted surface of the roof layer 360 and the second insulating layer 350, which is flat, is about 30° to about 90°, e.g., about 45°.

As described above, in controlling the thickness and angle of the roof layer 360, both thickness and angle may be simultaneously adjusted, or only one of the thickness and angle maybe adjusted. As one example, the thickness of the roof layer 360 may be increased or the angle of the roof layer 360 may be decreased. In another example, the angle of the roof layer 360 may be decreased while the thickness of the roof layer 360 is increased.

That is, when it is difficult control the angle of the roof layer 360, the remaining liquid crystals may be reduced by controlling the thickness of the roof layer 360. Similarly, when it is difficult to control the thickness of the roof layer 360, the remaining liquid crystals may be reduced by controlling only the angle of the roof layer 360.

When the thickness of the roof layer 360 increases as described above, the volume of the first valley area V1 generated between the roof layers 360 increases. Therefore, as the volume of the first valley area V1 increases, a volume accommodating the liquid crystals in the first valley area V1 increases. Therefore, a number of liquid crystals remaining on the roof layer 360 is reduced.

Similarly, as the angle between the tilted surface of the roof layer 360 and the second insulating layer 350 is reduced, the volume of the first valley area V1 increases. Similarly as above, a volume accommodating the liquid crystals in the first valley area V1 increases, and as a result, the liquid crystals are prevented from remaining on the roof layer 360.

In detail, by considering the volume corresponding to the first valley area V1 corresponding to each pixel, the volume of an area where the liquid crystals may be present is a sum of the volume corresponding to a rectangular area below the roof layer 360 and the volume corresponding to an area between facing tilted surfaces of adjacent roof layers 360. In this case, the volume corresponding to the rectangular area is maintained at a predetermined value regardless of the roof layer 360, while the volume corresponding to the area between the tilted surfaces increases as the thickness of the roof layer 360 increases or as the angle decreases. Therefore, as the volume increases, the amount of the liquid crystals that remains on the roof layer 360 decreases, thereby reducing the number of defective pixels.

The injection hole 307 exposing a part of the microcavity 305 is formed in, e.g., through, the common electrode 270, the second insulating layer 350, and the roof layer 360. A plurality of injection holes 307 may be formed to face, e.g., parallel, each other at the edges of the first subpixel area PXa and the second subpixel area PXb. That is, the injection holes 307 may correspond to the lower side of the first subpixel area PXa and the upper side of the second subpixel area PXb to expose a side of the microcavity 305. For example, each injection hole 307 may separate adjacent first and second subpixel areas PXa and PXb, so a sidewall of the microcavity 305 in each of the first and second subpixel areas PXa and PXb may be exposed through the injection hole 307. Since the microcavity 305 is exposed by the injection hole 307, an aligning agent or a liquid crystal material may be injected into the microcavity 305 through the injection hole 307.

An overcoat 390 may be formed, e.g., conformally, on the third insulating layer 370. The overcoat 390 is formed to cover sidewalls of the injection hole 307, through which a part of the microcavity 305 is exposed outside. That is, the overcoat 390 may seal the microcavity 305, so that the liquid crystal molecules 310 formed in the microcavity 305 are not discharged outside. Since the overcoat 390 contacts the liquid crystal molecules 310, the overcoat 390 may be made of a material which does not react with liquid crystal molecules 310, e.g., the overcoat 390 may be made of parylene and the like.

The overcoat 390 may be formed as a multilayer, e.g., a double layer or a triple layer. The double layer may be configured by two layers made of different materials. The triple layer may be configured by three layers, so materials of adjacent layers are different from each other. For example, the overcoat 390 may include a layer made of an organic insulating material and a layer made of an inorganic insulating material.

Although not illustrated, polarizers may be further formed on upper and lower sides of the display device. The polarizers may be configured by a first polarizer and a second polarizer. The first polarizer may be attached onto the lower side of the substrate 110, and the second polarizer may be attached onto the overcoat 390.

Next, a manufacturing method of a display device according to an exemplary embodiment will be described below with reference to FIGS. 5 to 10, in addition to FIGS. 1 to 4 together. FIGS. 5 to 10 illustrate cross-sectional views of stages in a manufacturing method of a display device according to an exemplary embodiment. It is noted that for convenience some of the elements illustrated in FIG. 2 are omitted from FIGS. 5-10.

First, the gate line 121 and the step-down gate line 123 extending in one direction may be formed on the substrate 110 made of glass or plastic, and the first gate electrode 124$h$, the second gate electrode 124$l$, and the third gate electrode 124$c$ which protrude from the gate line 121 are formed. Further, the storage electrode line 131 may be formed together so as to be spaced apart from the gate line 121, the step-down gate line 123, and the first to third gate electrodes 124$h$, 124$l$, and 124$c$.

Figure 5:
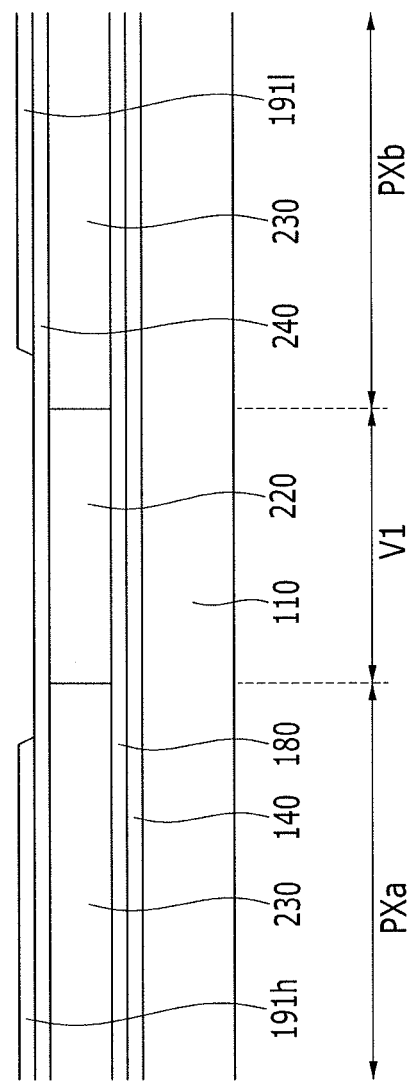
FIGS. 5 to 10 illustrate cross-sectional views of stages in a manufacturing method of a display device according to an exemplary embodiment.

Next, as illustrated in FIG. 5, the gate insulating layer 140 may be formed on the entire surface of a substrate 110 including the gate line 121, the step-down gate line 123, and first to third gate electrodes 124$h$, 124$l$, and 124$c$, and the storage electrode line 131 by using an inorganic insulating material, e.g., silicon oxide or silicon nitride. The gate insulating layer 140 may be formed as a single layer or as multiple layers.

Next, the first semiconductor 154$h$, the second semiconductor 154$l$, and the third semiconductor 154$c$ may be formed by depositing a semiconductor material, e.g., amorphous silicon, polycrystalline silicon, and/or metal oxide, on the gate insulating layer 140, and then patterning the deposited semiconductor material. The first semiconductor 154$h$ may be positioned on the first gate electrode 124$h$, the second semiconductor 154$l$ may be positioned on the second gate electrode 124$l$, and the third semiconductor 154$c$ may be positioned on the third gate electrode 124$c$.

Next, the data line 171 extending in the other direction may be formed by depositing a metal material and then patterning the deposited metal material. The metal material may be formed as a single layer or as multiple layers.

Further, the first source electrode 173$h$ protruding above the first gate electrode 124$h$ from the data line 171, and the first drain electrode 175$h$ spaced apart from the first source electrode 173$h$ may be formed together. Further, the second source electrode 173$l$ connected with the first source electrode 173$h$, and the second drain electrode 175$l$ spaced apart from the second source electrode 173$l$ may be formed together. Further, the third source electrode 173$c$ extended from the second drain electrode 175$l$, and the third drain electrode 175$c$ spaced apart from the third source electrode 173$c$ may be formed together.

The semiconductor material and the metallic material are consecutively deposited and thereafter, simultaneously patterned to form the first to third semiconductors 154$h$, 154$l$, and 154$c$, the data line 171, the first to third source electrodes 173$h$, 173$l$, and 173$c$, and the first to third drain electrodes 175$h$, 175$l$, and 175$c$. In this case, the first semiconductor 154$h$ may be extended to the lower portion of the data line 171.

The first/second/third gate electrodes 124$h$/124$l$/124$c$, the first/second/third source electrodes 173$h$/173$l$/173$c$, and the first/second/third drain electrodes 175$h$/175$l$/175$c$ form first/second/third thin film transistors (TFTs) Qh/Ql/Qc together with the first/second/third semiconductors 154$h$/154$l$/154$c$, respectively.

Subsequently, a passivation layer 180 is formed on the data line 171, the first to third source electrodes 173$h$, 173$l$, and 173$c$, the first to third drain electrodes 175$h$, 175$l$, and 175c and the semiconductors 154h, 154l, and 154c exposed between the respective source electrodes 173h/173l/173c and the respective drain electrodes 175h/175l/175c. The passivation layer 180 may be made of an organic insulating material or an inorganic insulating material, and may be formed as a single layer or as multiple layers.

Next, the color filter 230 is formed in each pixel area PX on the passivation layer 180. The color filter 230 is formed in each of the first subpixel area PXa and the second subpixel area PXb, and may not be formed at the first valley V1. Further, the color filters 230 having the same color may be formed in a column direction of the plurality of pixel areas PX. In the case of forming the color filters 230 having three colors, a first colored color filter 230 may be first formed and then a second colored color filter 230 may be formed by shifting a mask. Next, the second colored color filter 230 may be formed and then a third colored color filter may be formed by shifting a mask.

Next, the light blocking member 220 is formed on a boundary of each pixel area PX on the passivation layer 180 and the thin film transistor. The light blocking member 220 is formed at the first valley V1 positioned between the first subpixel area PXa and the second subpixel area PXb, e.g., the light blocking member 220 may be formed on the first valley V1 between adjacent portions of the color filter 230. For example, the light blocking member 220 may be formed after forming the color filters 230, but embodiments are not limited thereto, e.g., the light blocking member 220 may be formed before the color filters 230.

Next, the first insulating layer 240 made of an inorganic insulting material, e.g., silicon nitride ($SiN_x$), silicon oxide ($SiO_x$), and silicon oxynitride ($SiO_xN_y$), may be formed on the color filter 230 and the light blocking member 220.

Next, the first contact hole 185h may be formed by etching the passivation layer 180, the light blocking member 220, and the first insulating layer 240 so as to expose a part of the first drain electrode 175h, and the second contact hole 185l is formed so as to expose a part of the second drain electrode 175l.

Subsequently, the first subpixel electrode 191h is formed in the first subpixel area PXa, and a second subpixel electrode 191l is formed in second subpixel area PXb, by depositing and patterning a transparent metal material, e.g., indium tin oxide (ITO) and indium zinc oxide (IZO), on the first insulating layer 240. The first subpixel electrode 191h and the second subpixel electrode 191l are separated from each other with the first valley V1 therebetween. The first subpixel electrode 191h is connected with the first drain electrode 175h through the first contact hole 185h, and the second subpixel electrode 191l is connected to the second drain electrode 175l through the second contact hole 185l.

Horizontal stems 193h and 193l, and vertical stems 192h and 192l crossing the horizontal stems 193h and 193l are formed in the first subpixel electrode 191h and the second subpixel electrode 191l, respectively. Further, the plurality of minute branches 194h and 194l, which obliquely extend from the horizontal stems 193h and 193l and the vertical stems 192h and 192l, is formed.

Figure 6:
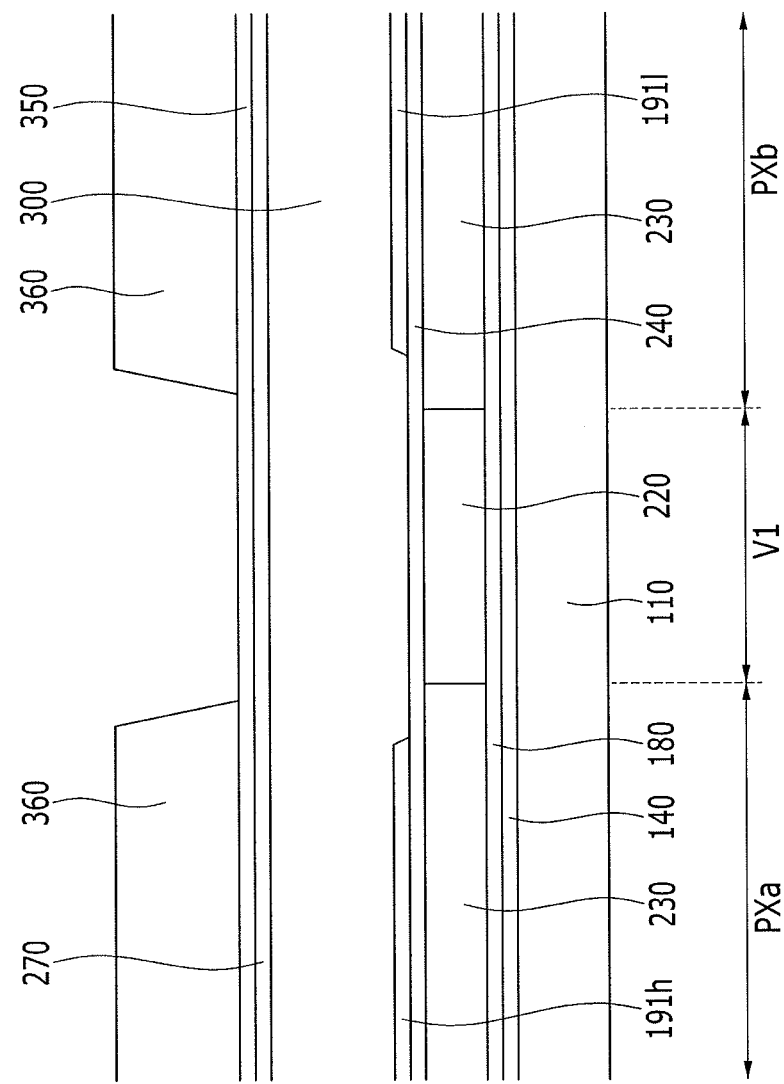

Next, referring to FIG. 6, a sacrificial layer 300 may be formed by coating a photosensitive organic material on the pixel electrode 191 and performing a photolithography process. A plurality of sacrificial layers 300 may be patterned to be connected to each other along the plurality of pixel columns. For example, a sacrificial layer 300 may be formed to cover each pixel area PX and to cover the first valley V1 positioned between the first subpixel area PXa and the second subpixel area PXb.

Subsequently, the common electrode 270 may be formed on the sacrificial layer 300 by depositing a transparent metal material, e.g., indium tin oxide (ITO) and indium zinc oxide (IZO). Next, the second insulating layer 350 may be formed on the common electrode 270 of an inorganic insulting material, e.g., silicon nitride ($SiN_x$), silicon oxide ($SiO_x$), and silicon oxynitride ($SiO_xN_y$).

Next, the roof layer 360 is formed by coating and patterning an organic material on the second insulating layer 350. In this case, the organic material positioned at the first valley V1 may be patterned so as to be removed. As a result, a plurality of roof layers 360 may be formed to be connected to each other along a plurality of pixel rows.

The thickness of the formed roof layer 360 may be more than about 4 μm. In particular, the roof layer 360 may be thicker than a roof layer according to a comparative example to be described below, e.g., the thickness of the roof layer 360 may be about 8 μm.

The reason is that as the thickness of the roof layer 360 increases, a center concentration effect of liquid crystals occurs. In other words, as the roof layer 360 is higher, liquid crystals concentrate in the first valley V1 positioned between adjacent roof layers 360. That is, even though some liquid crystals may contact the roof layer 360, the contact force with the roof layer 360 is low, and as a result, the liquid crystals are prevented from remaining on the roof layer 360.

Meanwhile, since the roof layers 360 are not positioned in the first valley V1, adjacent roof layers 360 are spaced apart from each other with the first valley V1 interposed therebetween. As a result, the roof layer 360 in an area adjacent to the first valley V1 has a surface which is inclined and tilted. In this case, an angle between the tilted surface of the roof layer 360 and the second insulating layer 350, which is flat, is about 30° to about 90°, e.g., about 45°.

As described above, in controlling the thickness and angle of the roof layer 360, both the angle and the thickness may be simultaneously controlled or only one can be controlled. For example, the thickness of the roof layer 360 may be increased or the angle of the roof layer 360 may be decreased, or the angle may be decreased while the thickness of the roof layer 360 is increased. That is, when it is difficult control the angle of the roof layer 360, the remaining liquid crystals may be reduced by controlling the thickness of the roof layer 360, and when it is difficult to control the thickness of the roof layer 360, the remaining liquid crystals may be reduced by controlling only the angle of the roof layer 360.

When the thickness of the roof layer 360 increases as described above, the volume of the first valley V1 generated between the roof layers 360 increases. Therefore, as the volume of the first valley V1 increases, a volume increases, in which the liquid crystals are positioned in the first valley V1, and a phenomenon in which the liquid crystals remain on the roof layer 360 is reduced. Further, similarly, as the angle between the tilted surface of the roof layer 360 and the second insulating layer 350 is reduced, the volume of the first valley V1 increases. Similarly as above, the volume in which the hit liquid crystals may be positioned in the first valley V1 increases, and as a result, the liquid crystals are prevented from remaining on the roof layer 360.

Figure 7:
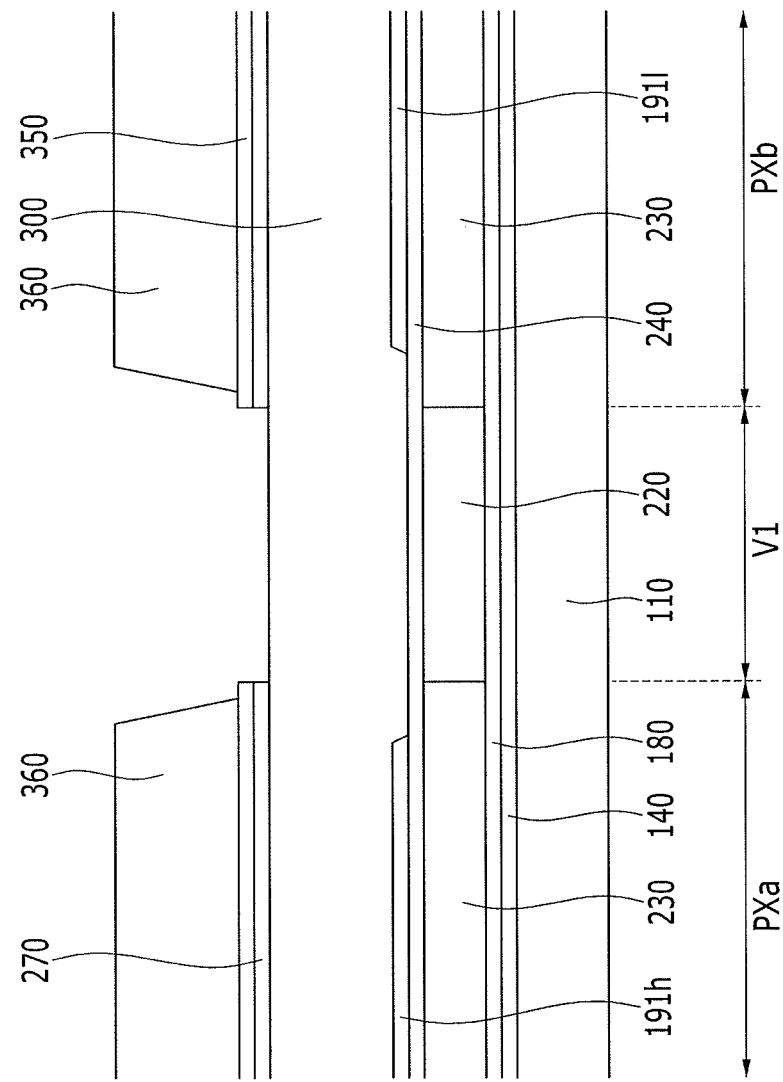

Next, as illustrated in FIG. 7, the second insulating layer 350 and the common electrode 270 may be patterned by using the roof layer 360 as a mask. First, the second insulating layer 350 is dry-etched by using the roof layer 360 as a mask, and then the common electrode 270 is wet-etched.

Figure 8:
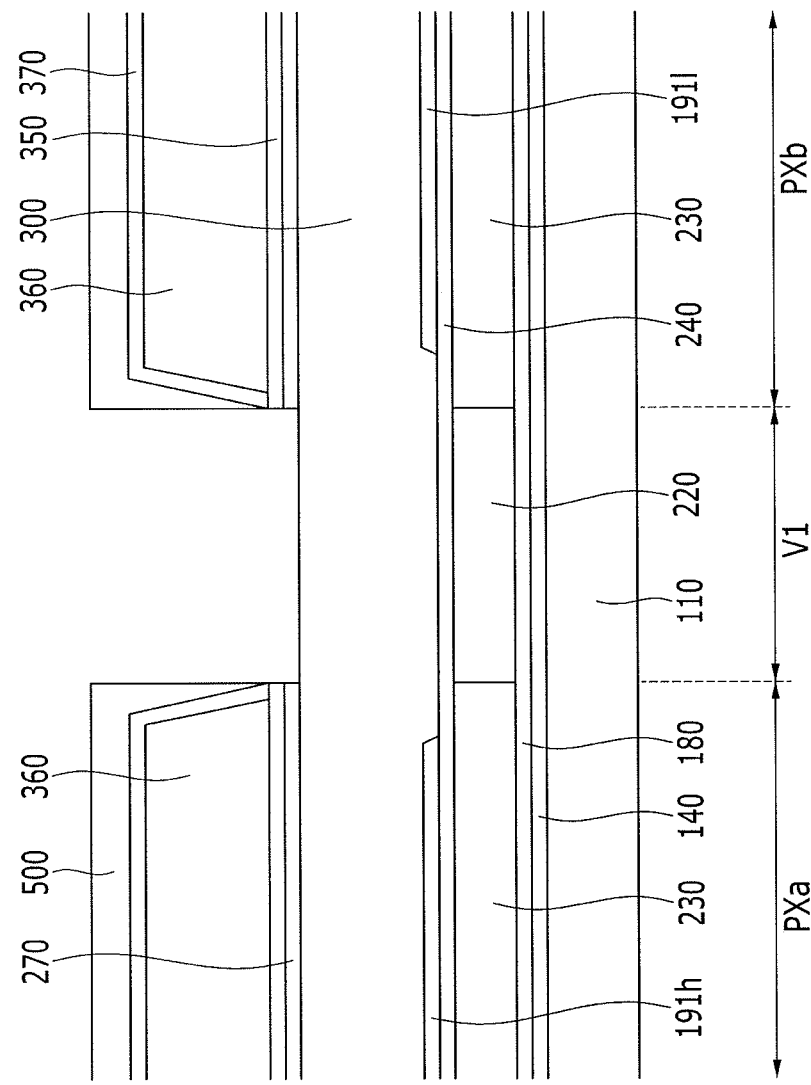

Next, as illustrated in FIG. 8, the third insulating layer 370 made of an inorganic insulting material, e.g., silicon nitride (SiN$_x$), silicon oxide (SiO$_x$), and/or silicon oxynitride (SiO$_x$N$_y$), may be formed on the roof layer 360. Next, a photoresist 500 may be coated on the third insulating layer 370, and the photoresist 500 may be patterned by a photolithography process. In this case, the photoresist 500 positioned at the first valley V1 may be removed. The third insulating layer 370 may be etched by using the patterned photoresist 500 as a mask, i.e., the third insulating layer 370 positioned at the first valley V1 is removed.

The third insulating layer 370 may be formed to cover the upper surface and the side of the roof layer 360 to protect the roof layer 360. The pattern of the third insulating layer 370 may be external to the roof layer 360, e.g., the third insulating layer 370 may be positioned at the outside of the pattern of the roof layer 360. The pattern of the second insulating layer 350 may be the same as the pattern of the third insulating layer 370, but the pattern of the second insulating layer 350 may be formed at an inside of the pattern of the roof layer 360. In this case, the third insulating layer 370 may be formed to contact the second insulating layer 350, e.g., the roof layer 360 may be completely enclosed between the second and third insulating layers 350 and 370.

Hereinabove, a facility for patterning the roof layer 360 may be different from a facility for patterning the third insulating layer 370, and a difference between the patterns of the third insulating layer 370 and the roof layer 360 may be increased due to an arrangement error between the facilities. In this case, a portion where the pattern of the third insulating layer 370 is positioned at the outside of the pattern of the roof layer 360 may be sagged or broken, but since the third insulating layer 370 is not a conductive member, problems, e.g., a short circuit between the third insulating layer 370 and the pixel electrode 191, may be eliminated.

Hereinabove, the process of forming the third insulating layer 370 is described, but embodiments are not limited thereto, e.g., the third insulating layer 370 may not be formed. When the third insulating layer 370 is not formed, problems, e.g., due to misalignment of the facility for patterning the roof layer 360 and the facility for patterning the third insulating layer 370, may be prevented. Further, since the second insulating layer 350 and common electrode 270 are patterned by using the roof layer 360 as a mask, the misalignment does not occur.

Figure 9:
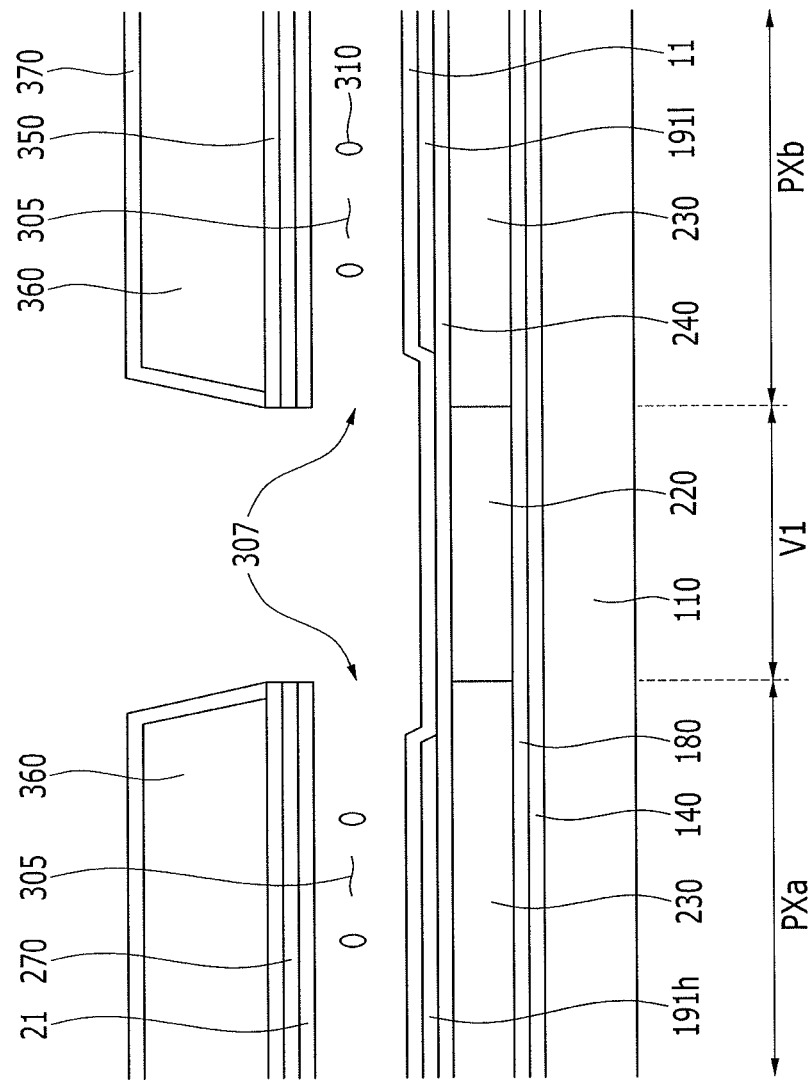

As illustrated in FIG. 9, the sacrificial layer 300 may be fully removed by supplying a developer and a stripper solution onto the substrate 110 where the sacrificial layer 300 is exposed, or by an ashing process. When the sacrificial layer 300 is removed, the microcavity 305 is generated at a site where the sacrificial layer 300 was previously positioned. That is, as illustrated in FIG. 9, when the sacrificial layer 300 is removed, a cavity is formed between the pixel electrode 191 and the common electrode 270.

In detail, the pixel electrode 191 and the common electrode 270 are spaced apart from each other with the microcavity 305 therebetween, and the pixel electrode 191 and the roof layer 360 are spaced apart from each other with the microcavity 305 therebetween. The common electrode 270 and the roof layer 360 are formed to cover the upper surface and both sides of the microcavity 305.

The microcavity 305 is exposed to an exterior through the injection hole 307 in the first valley V1, i.e., through an opening defined by removed portions of the roof layer 360, the second insulation layer 350, and the common electrode 270. The injection hole 307 may be formed along the first valley V1. Two injection holes 307 may be formed to face each other at opposite edges of the first subpixel area PXa and the second subpixel area PXb. That is, the injection holes 307 may correspond to the lower side of the first subpixel area PXa and the upper side of the second subpixel area PXb to expose a side of the microcavity 305. Further, the liquid crystal injection hole 307 may also be formed along the second valley V2.

Next, the roof layer 360 is cured by applying heat to the substrate 110. This is to maintain the shape of the microcavity 305 by the roof layer 360.

Next, when an aligning agent containing an alignment material drops on the substrate 110 by a spin coating method or an inkjet method, the aligning agent is injected into the microcavity 305 through the injection hole 307. When the aligning agent is injected into the microcavity 305 and then a curing process is performed, a solution component is evaporated and the alignment material remains on the inner wall of the microcavity 305.

Accordingly, the first alignment layer 11 may be formed on the pixel electrode 191, and the second alignment layer 21 may be formed below the common electrode 270. The first alignment layer 11 and the second alignment layer 21 face each other with the microcavity 305 therebetween and are connected to each other at an edge of the pixel area PX. In this case, the first and second alignment layers 11 and 21 may be aligned in a vertical direction to the substrate 110 except for the side of the microcavity 305. In addition, a process of irradiating a UV to the first and second alignment layers 11 and 21 is performed, and as a result, the first and second alignment layers 11 and 21 may be aligned in a horizontal direction to the substrate 110.

Next, a liquid crystal material constituted by the liquid crystal molecules 310 is applied to the substrate 110 by an inkjet method or a dispensing method, e.g., the liquid crystal material may be injected into the microcavity 305 through the injection hole 307. For example, the liquid crystal material may be injected through injection holes 307 of corresponding odd-numbered first valleys V1 (rather than injection holes 307 formed along the even-numbered first valley V1). In another example, the liquid crystal material may be injected through injection holes 307 of corresponding even-numbered first valley V1 (rather than injection holes 307 formed along the odd-numbered first valley V1).

When the liquid crystal material is injected in the injection holes 307 formed along the odd-numbered first valleys V1, the liquid crystal material passes through the injection hole 307 by capillary force to be injected into the microcavity 305. In this case, the liquid crystal material is injected into the microcavity 305 by discharging air in the microcavity 305 through the liquid crystal injection holes 307 formed along the even-numbered first valleys V1. Further, the liquid crystal material may be injected in all of the injection holes 307, i.e., the liquid crystal material may be injected in the injection holes 307 formed along both the odd-numbered first valleys V1 and the even-numbered first valleys V1.

When the liquid crystal material is injected into the microcavity 305 by the capillary force, some of the injected liquid crystals may contact the roof layer, and as a result, may potentially remain on the roof layer. However, as the roof layer 360 according to example embodiments has a large thickness and a small angle, a number of the liquid crystals remaining on the roof layer 360 decreases, thereby reducing the number of defective pixels.

Figure 10:
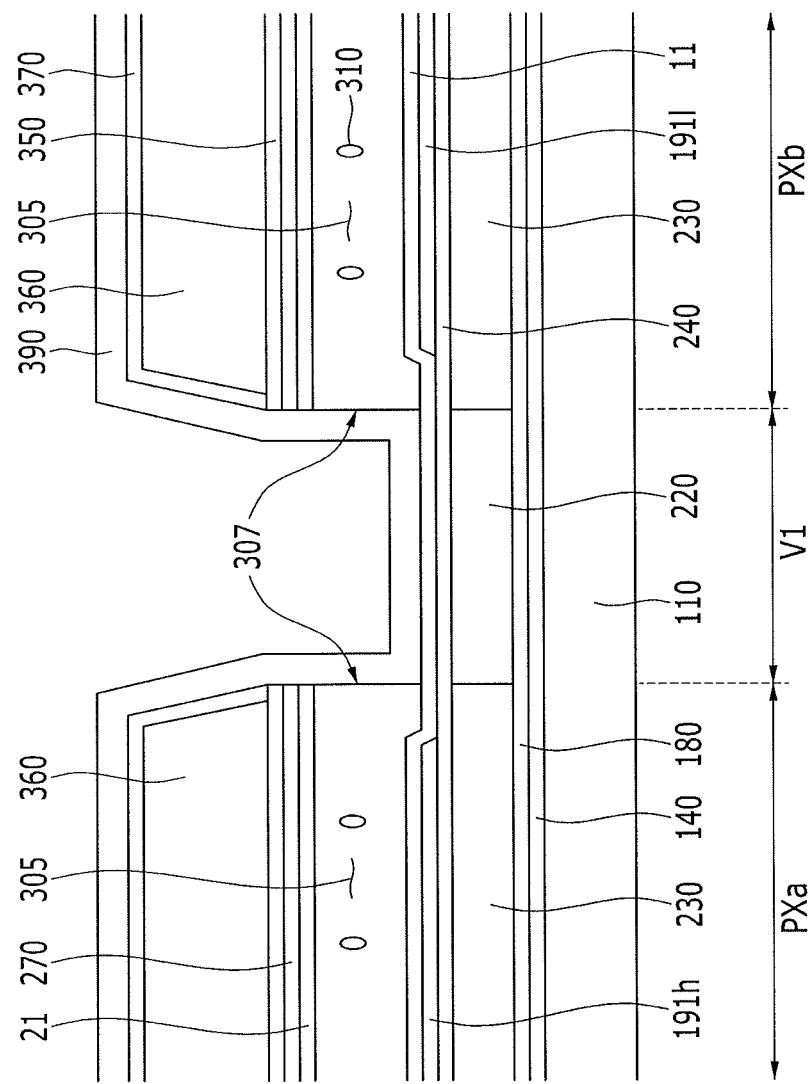

As illustrated in FIG. 10, the overcoat 390 may be formed by depositing a material which does not react with the liquid crystal molecules 310 on the third insulating layer 370. The overcoat 390 may be formed to cover the injection hole 307, i.e., where the microcavity 305 is exposed to the exterior, to seal the microcavity 305.

Next, although not illustrated, polarizers may be further attached onto the upper and lower sides of the display device. The polarizers may include a first polarizer and a second polarizer. The first polarizer may be attached onto the lower surface of the substrate 110, and the second polarizer may be attached onto the overcoat 390.

Figure 11:
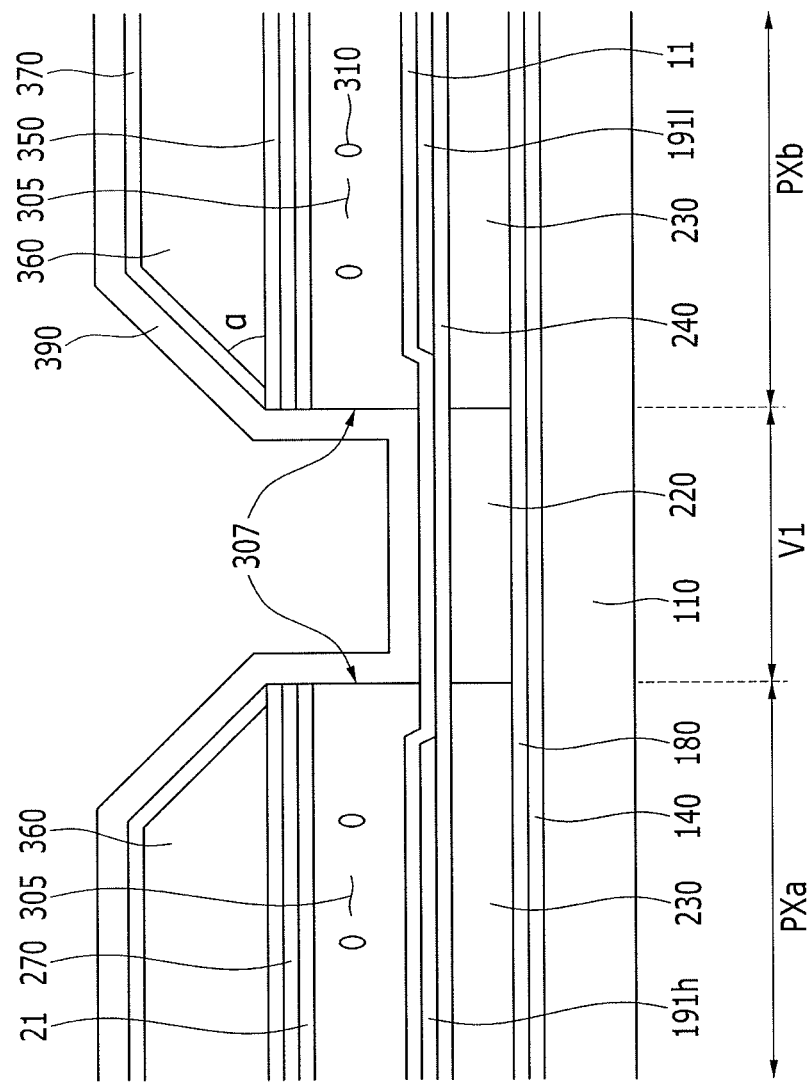
FIGS. 11 to 13 illustrate cross-sectional views of display devices according to other exemplary embodiments.
Figure 12:
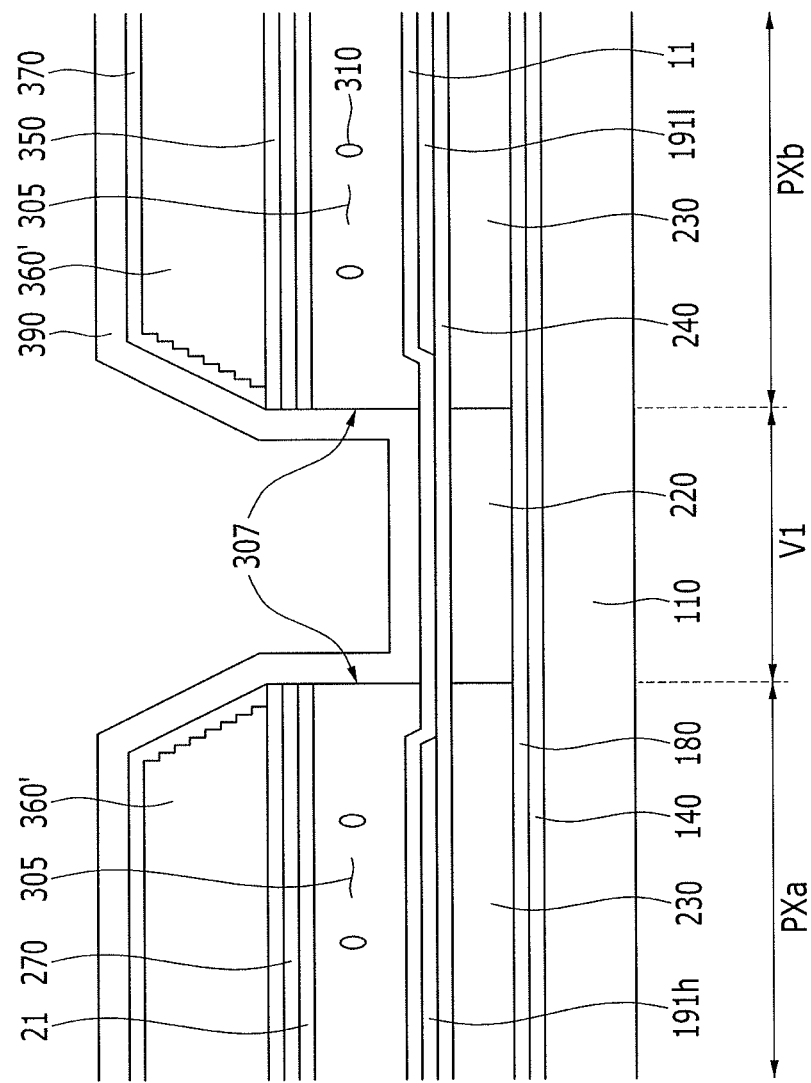
Figure 13:
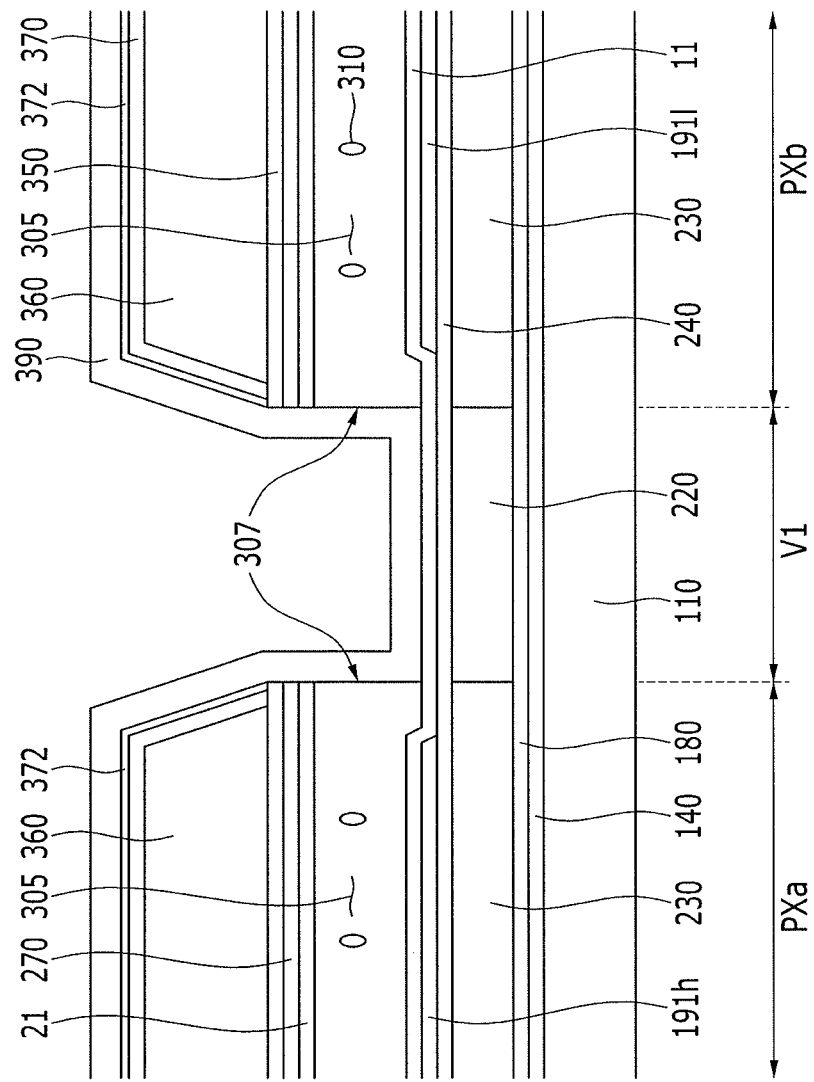

Next, a display device according to an exemplary embodiment will be described with reference to FIGS. 11 to 13. FIG. 11 illustrates a cross-sectional view of a display device, in which an angle between a roof layer and a second insulating layer is low according to an exemplary embodiment, FIG. 12 illustrates a cross-sectional view of a display device, in which one surface of a roof layer has a step shape according to an exemplary embodiment, and FIG. 13 illustrates a cross-sectional view of a display device further including a water-repellent layer according to an exemplary embodiment. Hereinafter, aforementioned constituent elements will be omitted and only different constituent elements will be described.

Referring to FIG. 11, a display device in which an angle between the roof layer 360 and the second insulating layer is significantly low is provided according to another exemplary embodiment. As the angle is low as described above, it is effective to remove the remaining liquid crystals. For example, an angle a between the rood layer 360 and the second insulating layer 350 may be about 45°, as illustrated in FIG. 11.

Further, referring to FIG. 12, one tilted surface of a roof layer 360' may have a step shape according to another exemplary embodiment. The step-shaped structure is used to prevent the liquid crystals from remaining on the roof layer 360' but is not limited to the shape illustrated in FIG. 12, e.g., the titled surface of a roof layer may have any suitable shape or structure for preventing the liquid crystals from remaining.

Further, referring to FIG. 13, the display device according to another exemplary embodiment may include a water-repellent layer 372. The water-repellent layer 372 may include a hydrophobic material to prevent the liquid crystals from remaining on the roof layer 360 or on the roof layer 360'. The water-repellent layer 372 has been described in the exemplary embodiment but is not limited thereto, e.g., all layers may be hydrophobic in order to prevent the liquid crystals from remaining on the roof layer 360.

Figure 14A:
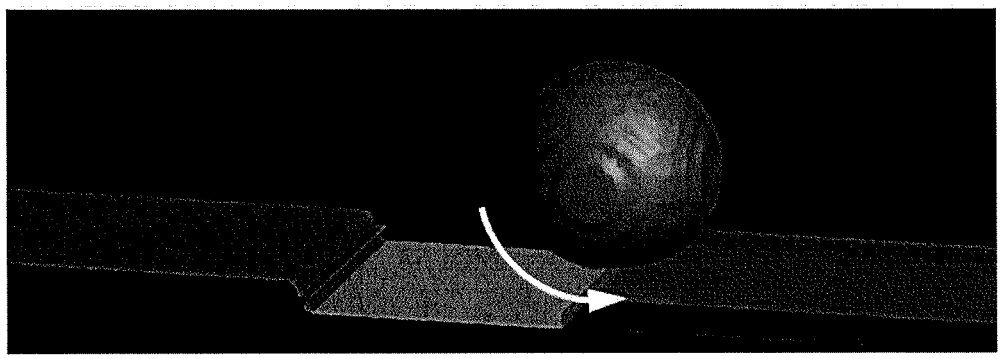
FIGS. 14A-14B illustrate simulation results for unidirectional and bidirectional liquid crystal injections, respectively.
Figure 14B:
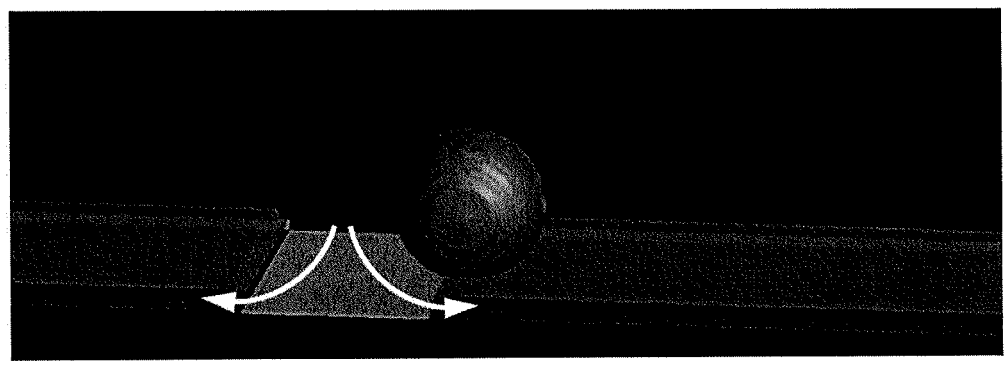

Next, a liquid crystal margin simulation result for a display device according to an exemplary embodiment will be described below with reference to FIGS. 14A to 16. FIGS. 14A-14B illustrate a simulation result of a display device with a roof layer having a thickness of 3.5 µm as a comparative example, FIGS. 15A-15B illustrate a simulation result of unidirectional liquid crystals injected into a display device with a roof layer having a thickness of 8 µm and an angle between the roof layer and the insulating layer of 45° in accordance with embodiments, and FIG. 16 illustrates a simulation result of bidirectional liquid crystals injected into the device of FIGS. 15A-15B.

It is noted that FIG. 14A illustrates a simulation result for unidirectional liquid crystal injection, and FIG. 14B illustrates a simulation result for bidirectional liquid crystal injection to verify that liquid crystals which remain slightly are generated. Further, FIG. 15A illustrates a simulation result for unidirectional injection in which the liquid crystals are hit at a left side, and FIG. 15B illustrates a simulation result for unidirectional injection in which the liquid crystals are hit at a right side.

Figure 15A:
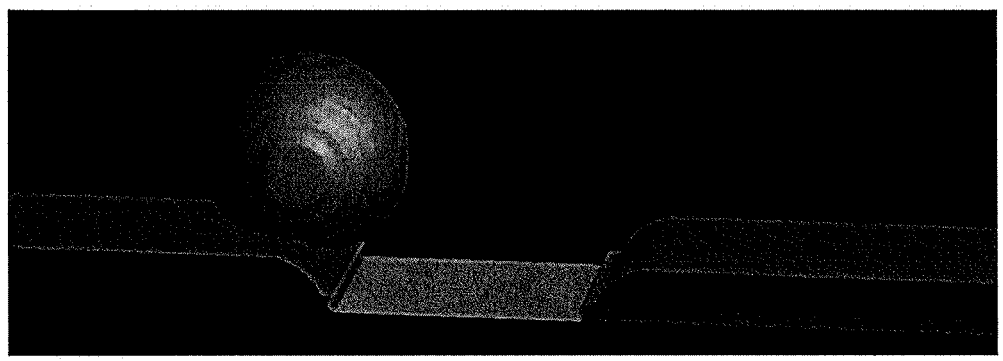
FIGS. 15A-15B illustrate simulation results for unidirectional injections in which the liquid crystals are hit at left and right sides, respectively.
Figure 15B:
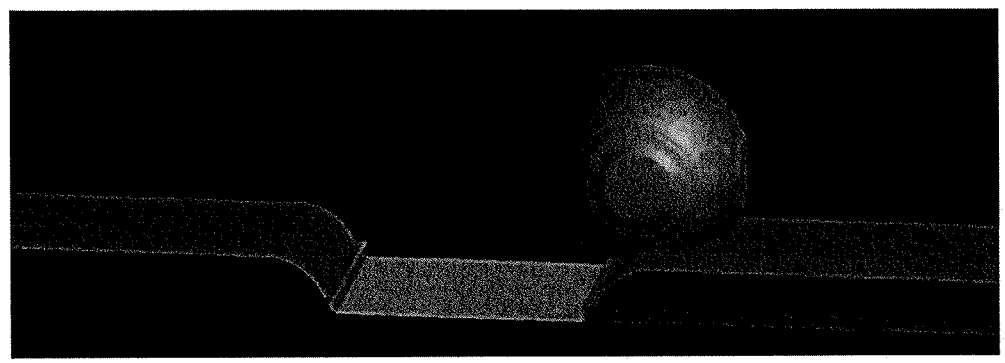

Therefore, in the display device according to FIGS. 15A-15B, a hitting margin is approximately 34 µm and is larger than that of FIGS. 14A-14B by about 21%. That is, the hitting margin increases, and as a result, the number of liquid crystals that remain on the roof layer decreases. Further, as a result of examining the liquid crystal injection, it is verified that the liquid crystals are also well injected.

Figure 16:
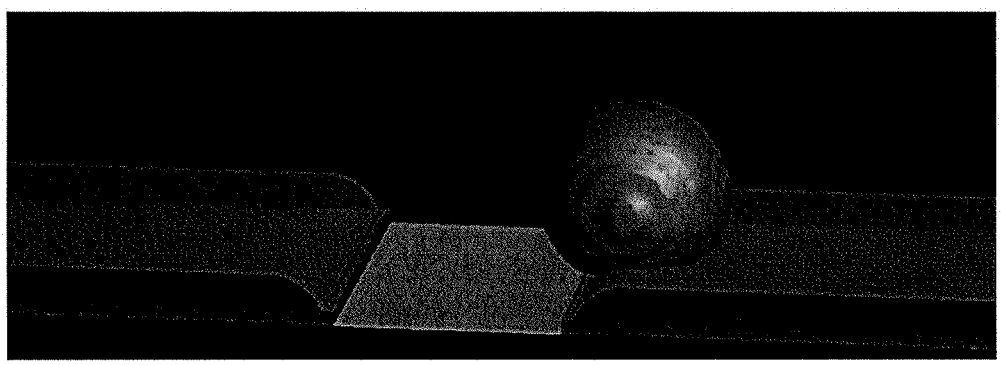
FIG. 16 illustrates a simulation result in a display device in which the liquid crystals are injected bidirectionally.

FIG. 16 illustrates the simulation result for the display device in which the liquid crystals are injected bidirectionally. As the simulation result, the hitting margin is approximately 38 µm and it is verified that the target margin is larger than that of the comparative example of FIG. 14 by approximately 30%. Further, similarly as FIGS. 15A-15B, the liquid crystals are well injected and it is verified that the number of the remaining liquid crystals decreases.

Therefore, according to the display device of FIGS. 15A-15B and 16, the hitting margin is larger than that of the comparative example. This means that an effect in which the liquid crystals are concentrated at the valley area between the roof layers occurs and means that a wetting distance of the liquid crystals is minimized. Therefore, according to the exemplary embodiment, a display device is realized in which the number of remaining liquid crystals decreases, as well as the number of defective pixels.

By way of summary and review, a conventional liquid crystal display may include two sheets of substrates, and respective constituent elements are formed on the two sheets of substrates. As a result, the display device may be heavy and thick, may have a high cost, and may require a long processing time.

In contrast, the liquid crystal display according to example embodiments includes a single substrate, thereby reducing weight, thickness, cost, and manufacturing time thereof. Further, the liquid crystal display according to example embodiments includes a roof layer, so the liquid crystal layer is between the single substrate and the roof layer. The thickness of the roof layer, as well as an angle between the roof layer and the second insulating layer, is adjusted to minimize the number of liquid crystals remaining on the roof layer during injection of the liquid crystals into microcavities beneath the roof layer, thereby preventing or substantially minimizing image quality defects due to remaining liquid crystals' deterioration.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A display device, comprising:
   a substrate including a plurality of pixel areas;
   a thin film transistor positioned on the substrate;
   a first insulating layer positioned on the thin film transistor;

a pixel electrode connected with the thin film transistor and positioned on the first insulating layer;

a color filter positioned between the substrate and the pixel electrode;

a common electrode positioned on the pixel electrode and spaced apart from the pixel electrode by a microcavity;

a second insulating layer positioned on the common electrode;

a roof layer positioned on the second insulating layer, a thickness of the roof layer being about 4 µm to about 50 µm;

an injection hole through the common electrode, the second insulating layer, and the roof layer, the injection hole exposing a part of the microcavity;

a liquid crystal layer filling the microcavity;

an overcoat positioned on the roof layer and extending into the injection hole, the overcoat sealing the microcavity; and a third insulating layer positioned between the overcoat and the roof layer.

2. The display device as claimed in claim 1, wherein the thickness of the roof layer is about 8 µm to about 50 µm.

3. The display device as claimed in claim 2, wherein an angle between the roof layer and the second insulating layer is about 45°.

4. The display device as claimed in claim 1, wherein an angle between the roof layer and the second insulating layer is about 30° to about 90°.

5. The display device as claimed in claim 4, wherein the angle between the roof layer and the second insulating layer is about 45°.

6. The display device as claimed in claim 4, wherein a tilted surface of the roof layer has a step shape.

7. The display device as claimed in claim 1, further comprising a water-repellent layer positioned on the roof layer.

8. The display device as claimed in claim 1, wherein the second insulating layer includes at least one of silicon nitride, silicon oxide, and silicon oxynitride.

9. The display device as claimed in claim 1, wherein the third insulating layer includes at least one of silicon nitride, silicon oxide, and silicon oxynitride.

10. The display device as claimed in claim 1, wherein the overcoat positioned in the injection hole defines a valley between adjacent microcavities, a bottom of the valley being lower than a top of the microcavities.

11. A manufacturing method of a display device, the method comprising:

forming a thin film transistor on a substrate, the substrate including a plurality of pixel areas;

forming a first insulating layer on the thin film transistor;

forming a pixel electrode connected with the thin film transistor on the first insulating layer;

forming a color filter between the substrate and the pixel electrode; forming a sacrificial layer on the pixel electrode; forming a common electrode on the sacrificial layer;

forming a second insulating layer on the common electrode;

forming a roof layer by applying and patterning an organic material onto the second insulating layer, a thickness of the roof layer being about 4 µm to about 50 µm; exposing the sacrificial layer;

forming a microcavity between the pixel electrode and the common electrode by removing the exposed sacrificial layer;

forming an injection hole through the common electrode, the second insulating layer, and the roof layer, the injection hole exposing a part of the microcavity;

forming a liquid crystal layer by injecting a liquid crystal material into the microcavity;

forming an overcoat on the roof layer and in the injection hole, such that the overcoat seals the microcavity; and forming a third insulating layer between the overcoat and the roof layer.

12. The method as claimed in claim 11, wherein the thickness of the roof layer is about 8 µm to about 50 µm.

13. The method as claimed in claim 11, wherein an angle between the roof layer and the second insulating layer is about 30° to about 90°.

14. The method as claimed in claim 13, wherein the angle between the roof layer and the second insulating layer is about 45°.

15. The method as claimed in claim 13, wherein a tilted surface of the roof layer has a step shape.

16. The method as claimed in claim 11, further comprising forming a water-repellent layer on the formed roof layer.

17. The method as claimed in claim 16, further comprising removing the third insulating layer formed directly on the sacrificial layer by patterning the third insulating layer.

18. The method as claimed in claim 17, wherein the sacrificial layer is ashed, and thereafter, the third insulating layer is formed.

19. The method as claimed in claim 18, wherein during ashing of the sacrificial layer, the third insulating layer positioned directly on the sacrificial layer is lifted off.

* * * * *